United States Patent [19]

Lombardi et al.

[11] Patent Number: 4,579,291
[45] Date of Patent: Apr. 1, 1986

[54] ADJUSTABLE CHUCK FOR ARMATURE WINDING MACHINES

[75] Inventors: Massimo Lombardi; Luciano Santandrea, both of Florence, Italy

[73] Assignee: Axis S.p.A., Italy

[21] Appl. No.: 489,330

[22] Filed: Apr. 28, 1983

[30] Foreign Application Priority Data

May 21, 1982 [IT] Italy .................. 9408 A/82

[51] Int. Cl.⁴ .......................................... H02K 15/09
[52] U.S. Cl. ........................................... 242/7.05 B
[58] Field of Search ............... 242/7.05 R, 7.05 B, 242/7.05 C, 1.1 E; 29/598, 7.05 A

[56] References Cited

U.S. PATENT DOCUMENTS

| | | | |
|---|---|---|---|
| 1,121,798 | 12/1914 | Chapman | 242/7.05 R |
| 1,353,269 | 9/1920 | Rhoades | 242/7.05 A |
| 1,371,647 | 3/1921 | Sandell | 242/7.05 A |
| 1,500,181 | 7/1924 | Chapman | 242/7.05 R |
| 1,503,254 | 7/1924 | Sippel et al. | 242/7.05 R |
| 1,523,630 | 1/1925 | Chapman | 242/7.05 R |
| 2,007,830 | 7/1935 | McNeill | |
| 3,281,084 | 10/1966 | Lill | 242/1.1 E |

FOREIGN PATENT DOCUMENTS 136920 4/1950 Australia .............. 242/7.05 A

Primary Examiner—Billy S. Taylor
Attorney, Agent, or Firm—Lerner, David, Littenberg, Krumholz & Mentlik

[57] ABSTRACT

An adjustable chuck for armature winding machines employs a pair of stationary longitudinal deflectors or wings and a separate pair of frontal deflectors or wings. At least one of the frontal deflectors is movable independently of the longitudinal deflectors so that the chuck can be adjusted to accommodate armatures having cores of various different lengths. Regardless of whether the frontal deflectors have been positioned to accommodate a long or short armature, they cooperate with the longitudinal deflectors to form a continuous wire guide path for a wire being wound around the armature.

8 Claims, 7 Drawing Figures

ADJUSTABLE CHUCK FOR ARMATURE WINDING MACHINES

FIELD OF THE INVENTION

The present invention relates to adjustable chucks for armature winding machines, and, more particularly, to such chucks which can be adjusted to accommodate armatures having cores of various different lengths. As used herein, the term "armature winding machines" denotes machines which are adapted to form coils of wire around rotors or other similar internal parts, such as armatures, of electric motors.

BACKGROUND OF THE INVENTION

It is well known to wind a wire (i.e., a lead) into a pair of slots in a core of an armature using at least one rotatable wire feeding mechanism (i.e., a flyer). Such wire feeding mechanisms require the use of a deflecting mechanism (i.e., a chuck) adapted to guide the wire into the slots of the armature core.

There are basically two types of chucks. One type actually grips the armature core. The other type is positioned adjacent to the armature core without actually touching it.

Generally, both types of chucks are symmetrical about horizontal and vertical planes which include the axis of rotation of the flyer or flyers. More particularly, each chuck includes at least two of the following three types of deflectors or wings.

The first type of deflector is a contoured longitudinal deflector which is arranged parallel to a shaft of the armature and positioned alongside a slot in the armature core. This first type of deflector has a shape selected so as to guide the wire toward the adjacent slot without allowing the wire to touch the edge of the slot, thereby preventing damage to the insulation on the wire during the winding operation. Thus, in addition to functioning as a guide, this type of deflector also functions as a shield to prevent the wire from rubbing against the edge of the slot into which the wire is being wound.

The second type of deflector is a contoured frontal deflector which is positioned adjacent to one end of the armature core. This type of deflector has a shape selected so as to guide the wire as it enters or exits the slot, thereby properly shaping the coil near the shaft of the armature.

The third type of deflector is a straight longitudinal deflector which is similar to the first type of deflector in that it also functions to guide the wire and to prevent the wire from rubbing against the edge of the slot in the armature core. This third type of deflector is usually employed in combination with a shaped frontal type of deflector.

Nonadjustable chucks are known. These nonadjustable chucks are disadvantageous because they are specifically designed for use in connection with armatures having cores of a particular length. Thus, if a winding operation is to be performed on an armature having a different length core, the chuck must be removed and replaced with another chuck. Such a replacement operation is both time consuming and costly.

Chucks which can be adjusted to accommodate armatures having cores of various different lengths are also known (see, for instance, Australian Pat. No. 136,920 and U.S. Pat. Nos. 1,121,798 and 1,353,269). Because the adjustable chucks disclosed in Australian Pat. No. 136,920 and U.S. Pat. No. 1,121,798 do not provide a continuous guiding surface for the wire being wound, they are not especially suited for use in connection with high speed winding machines. Although U.S. Pat. No. 1,353,269 discloses an adjustable chuck which forms a continuous wire guide, adjustment of the chuck to accommodate armatures having various different lengths requires adjusting two longitudinal deflectors in order to achieve the required adjustment of the two frontal deflectors. Because the frontal deflectors are not adjustable independently of the longitudinal deflectors, the adjustment of the chuck to accommodate armatures having various different lengths is relatively complicated and time consuming.

SUMMARY OF THE INVENTION

Many of the disadvantages and shortcomings of the prior art chucks described above are overcome in accordance with the present invention by providing a new and improved adjustable chuck adapted to continuously guide a wire as it is being wound into a pair of slots in a core of an armature. More particularly, the chuck includes a first guide member (i.e., one longitudinal deflector or wing) positioned adjacent to one of the slots and extending along at least the entire length of the core of the armature. A second guide member (i.e., another longitudinal deflector or wing), which is positioned adjacent to the other slot, also extends along at least the entire length of the core of the armature. Positioned adjacent to one end of the core of the armature is a third guide member (i.e., one frontal deflector or wing), which extends between the first and second guide members. A fourth guide member (i.e., another frontal deflector or wing), which also extends between the first and second guide members, is positioned adjacent to an opposite end of the core of the armature. An adjusting mechanism adjusts the position of the third guide member relative to the fourth guide member without having to adjust the first and second guide members, which can therefore be stationary. By adjusting the position of the third guide member relative to the fourth guide member, the chuck can be adjusted to accommodate armatures having cores of various different lengths.

If only the third guide member is adjustable, a movable counterweight is provided on the chuck. The counterweight is moved depending upon the position of the third guide member to maintain the chuck in proper balance.

It is also possible to adjust the position of both the third and fourth guide members. When the third and fourth guide members are both adjustable, they are simultaneously moved away from each other in order to accommodate armatures having longer cores and toward each other in order to accommodate armatures having shorter cores.

In one embodiment, the adjusting mechanism includes a first internally threaded member, which is fixedly attached to the third guide member, and a first externally threaded member, which threadedly engages the first internally threaded member such that rotation of the first externally threaded member causes the automatic linear movement of the first internally threaded member and hence the third guide member. If the fourth guide member is also adjustable, the adjusting mechanism further includes a second internally threaded member, which is fixedly attached to the fourth guide member, and a second externally threaded member, which threadedly engages the second internally threaded member such that rotation of the second externally threaded member causes the automatic linear movement of the second internally threaded member and hence the fourth guide member. By fixedly connecting the first externally threaded member to the second externally threaded member, the second externally threaded member can be rotated in response to the rotation of the first externally threaded member.

In another embodiment, the adjusting mechanism includes a first rack fixedly attached to the third guide member and a sprocket wheel having sprockets which mesh with the first rack such that rotation of the sprocket wheel causes the automatic linear movement of the first rack and hence the third guide member. If the fourth guide member is also adjustable, the adjusting mechanism further includes a second rack fixedly attached to the fourth guide member and designed for meshing engagement with the sprockets of the sprocket wheel such that rotation of the sprocket wheel causes the automatic linear movement of the second rack and hence the fourth guide member.

The first and second guide members may be provided with a substantially flat central portion and pair of curved ends designed to facilitate wire guidance. The central portions are used to support the first and second guide members from a supporting or mounting structure, which includes a first guide channel for guiding the third guide member during its adjustment. If the fourth guide member is also adjustable, the supporting or mounting structure further includes a second guide channel for guiding the fourth guide member during its adjustment.

BRIEF DESCRIPTION OF THE DRAWINGS

For a better understanding of the present invention, reference is made to the following description of three exemplary embodiments considered in conjunction with the accompanying drawings, in which.

DESCRIPTION OF THE EXEMPLARY EMBODIMENTS

Figure 1:
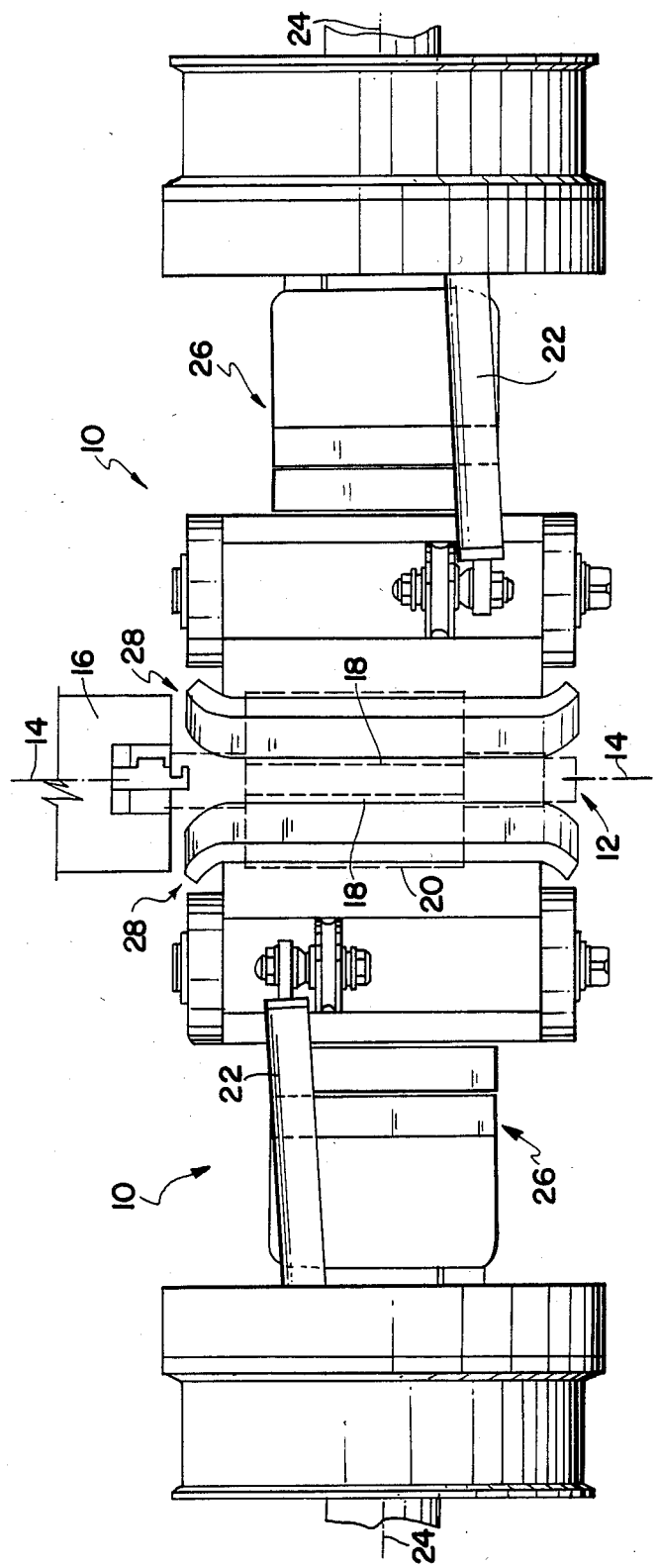
FIG. 1 is a top view of an armature winding machine equipped with an adjustable chuck assembly constructed in accordance with one exemplary embodiment of the present invention.

With reference to FIGS. 1–4, there is shown a pair of armature winding machines 10, each of the armature winding machines 10 flanking an opposite side of a winding station for an armature 12 (shown in phantom) which is supported for incremental rotation about an axis 14 by a collet 16. As the armature 12 is incrementally rotated (i.e., indexed), different pairs of slots 18 in a core 20 of the armature 12 are successively positioned so as to receive lead wires (not shown) which are wound into coils having a multiplicity of turns by flyers 22 which rotate about an axis 24 arranged perpendicular to the axis 14. In addition to the flyer 22, each of the armature winding machines 10 includes a stationary hub 26. Each of the hubs 26 is provided with a chuck 28, which is balanced by a counterweight 30 (see FIGS. 3 and 4).

Figure 2:
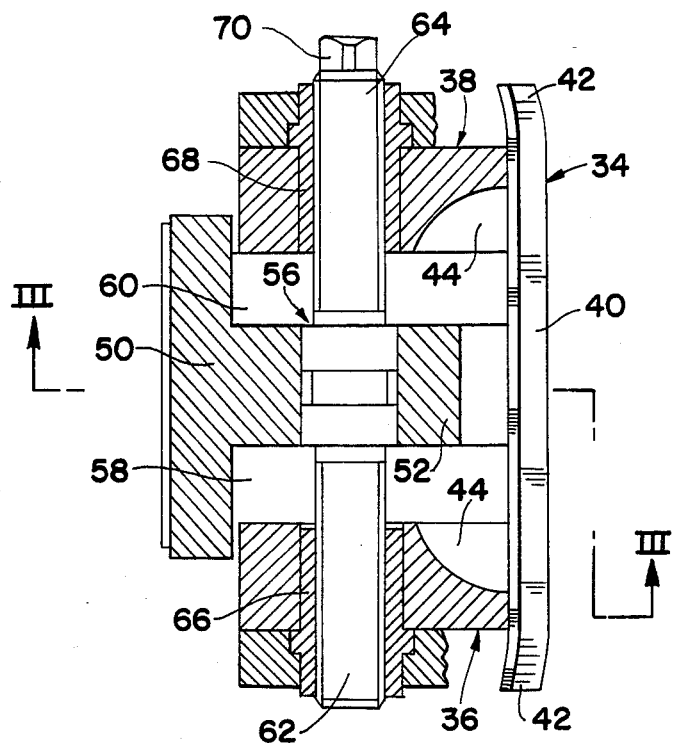
FIG. 2 is a partial cross-sectional view, taken along line II—II of FIG. 3 and looking in the direction of the arrows, of the adjustable chuck assembly illustrated in FIG. 1.
Figure 3:
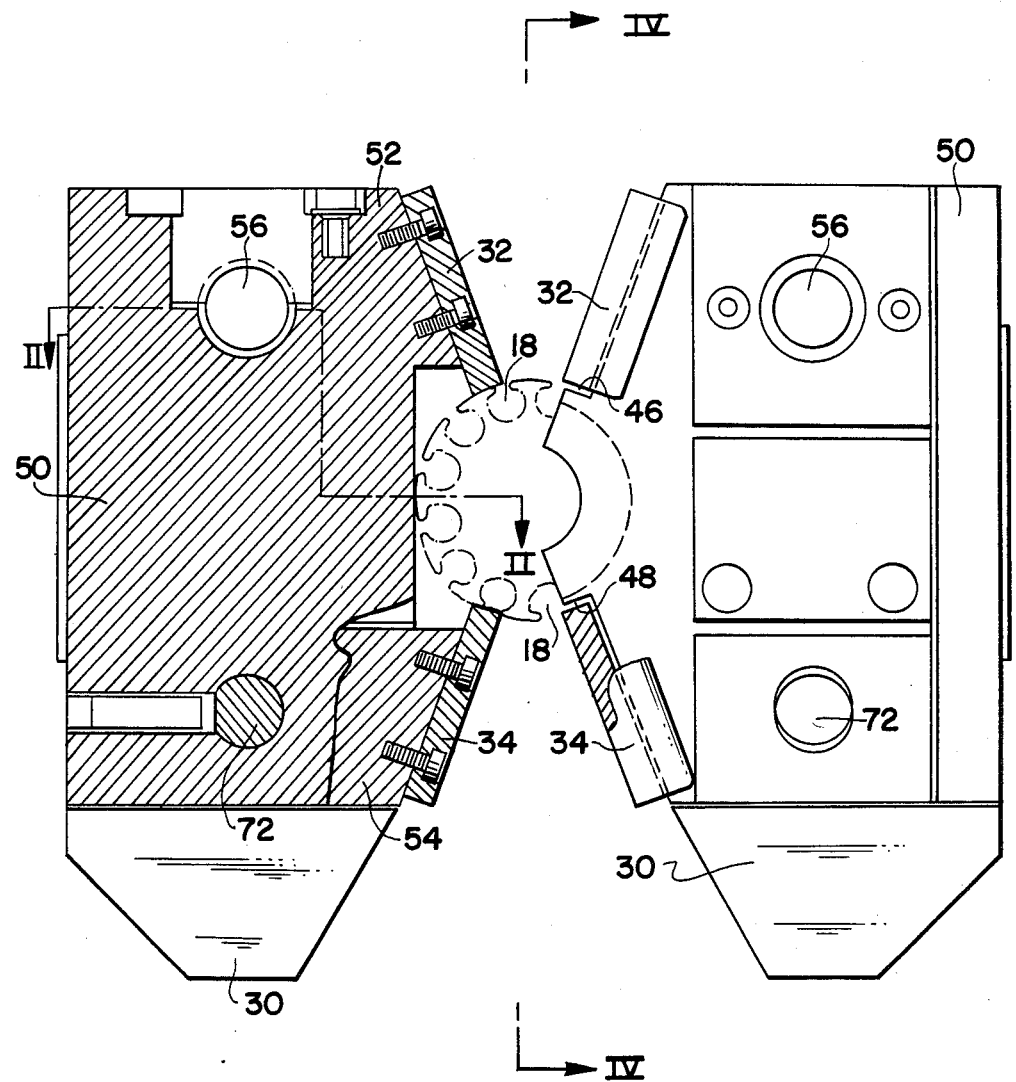
FIG. 3 is a partial cross-sectional view, taken along line III—III of FIG. 2 and looking in the direction of the arrows, of the adjustable chuck assembly shown in FIG. 2.
Figure 4:
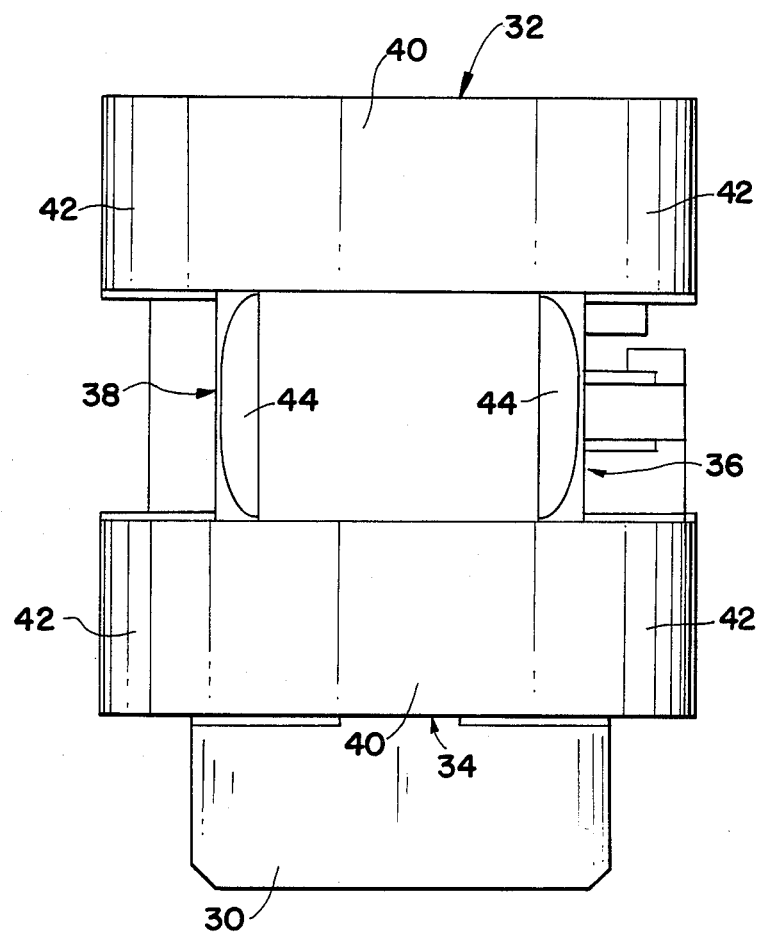
FIG. 4 is a side elevational view, taken along line IV—IV of FIG. 3 and looking in the direction of the arrows, of the adjustable chuck assembly illustrated in FIG. 3.

With particular reference to FIGS. 2–4, each of the chucks 28 includes a pair longitudinal deflectors or wings 32, 34 and a separate pair of frontal deflectors or wings 36, 38. The longitudinal deflectors 32, 34 cooperate with the frontal deflectors 36, 38 to form a continuous guide path for the lead wire as it is being wound into a coil by the flyer 22, thereby facilitating the high speed winding operation performed by the flyer 22.

Each of the longitudinal deflectors 32, 34 is positioned adjacent to a corresponding one of the slots 18 such that the longitudinal deflectors 32, 34 guide the lead wire into a selected pair of the slots 18. More particularly, each of the longitudinal deflectors 32, 34 includes a substantially flat central portion 40 flanked by ends 42 which are curved to facilitate guidance of the lead wire.

The frontal deflectors 36, 38 extend between the longitudinal deflectors 32, 34 at opposite ends of the core 20 of the armature 12, each of the frontal deflectors 36, 38 being mounted for reciprocating movement in a direction parallel to the axis 14. Thus, by moving the frontal deflectors 36, 38 toward and away from each other, the chuck 28 can be adjusted to accommodate armatures having cores which are shorter or longer than the core 20 of the armature 12.

Each of the frontal deflectors 36, 38 includes an archshaped and chamfered portion 44, which is designed to properly guide the lead wire, and notches 46, 48, which are designed to match the shape of the inner surface of the longitudinal deflectors 32, 34, respectively. In order to maintain the continuity of the wire guide path, the longitudinal deflectors 32, 34 are received in the notches 46, 48, respectively, such that the longitudinal deflectors 32, 34 project slightly beyond the archshaped and chamfered portions 44 of the frontal deflectors 36, 38. The longitudinal deflectors 32, 34 are longer than the core 20 of the armature 12 so that the continuous wire guide path for the lead wire can also be maintained when the frontal deflectors 36, 38 are moved away from each other to accommodate armatures having cores which are longer than the core 20 of the armature 12.

Each of the chucks 28 also includes a mounting block 50 having extensions 52, 54 which fixedly support the longitudinal deflectors 32, 34, respectively, from their central portions 40. The mounting block 50 also includes a rotatable rod 56 and guide channels 58, 60, which are sized and shaped so as to movably receive the frontal deflectors 36, 38, respectively.

The rod 56 has a pair of externally threaded ends 62, 64. The externally threaded end 62 of the rod 56 threadedly engages an internally threaded sleeve 66 which is fixed to the frontal deflector 36 such that rotation of the rod 56 will cause the automatic linear movement of the internally threaded sleeve 66 and hence the frontal deflector 36. The externally threaded end 64 of the rod 56 threadedly engages an internally threaded sleeve 68 which is fixed to the frontal deflector 38 such that rotation of the rod 56 will cause the automatic linear movement of the internally threaded sleeve 68 and hence the frontal deflector 38. The threaded end 64 of the rod 56 terminates in a head 70 designed to permit the manual or automatic rotation of the rod 56. More particularly, when the rod 56 is rotated in one angular direction, the front deflectors 36, 38 are simultaneously moved away from each other at the same rate to thereby accommodate armatures having cores which are longer than the core 20 of the armature 12. When, on the other hand, the rod 56 is rotated in an opposite anuglar direction, the frontal deflectors 36, 38 are simultaneously moved toward each other at the same rate to thereby accommodate armatures having cores which are shorter than the core 20 of the armature 12.

A guide bar 72 extends through the core 50 into the frontal deflectors 36, 38. The guide bar 72 is arranged generally parallel to the rod 56 to thereby facilitate the guidance of the frontal deflectors 36, 38 as they move in the guide channels 58, 60, respectively. Alternatively, the guide bar 72 can be replaced by a threaded rod like the threaded rod 56.

Figure 5:
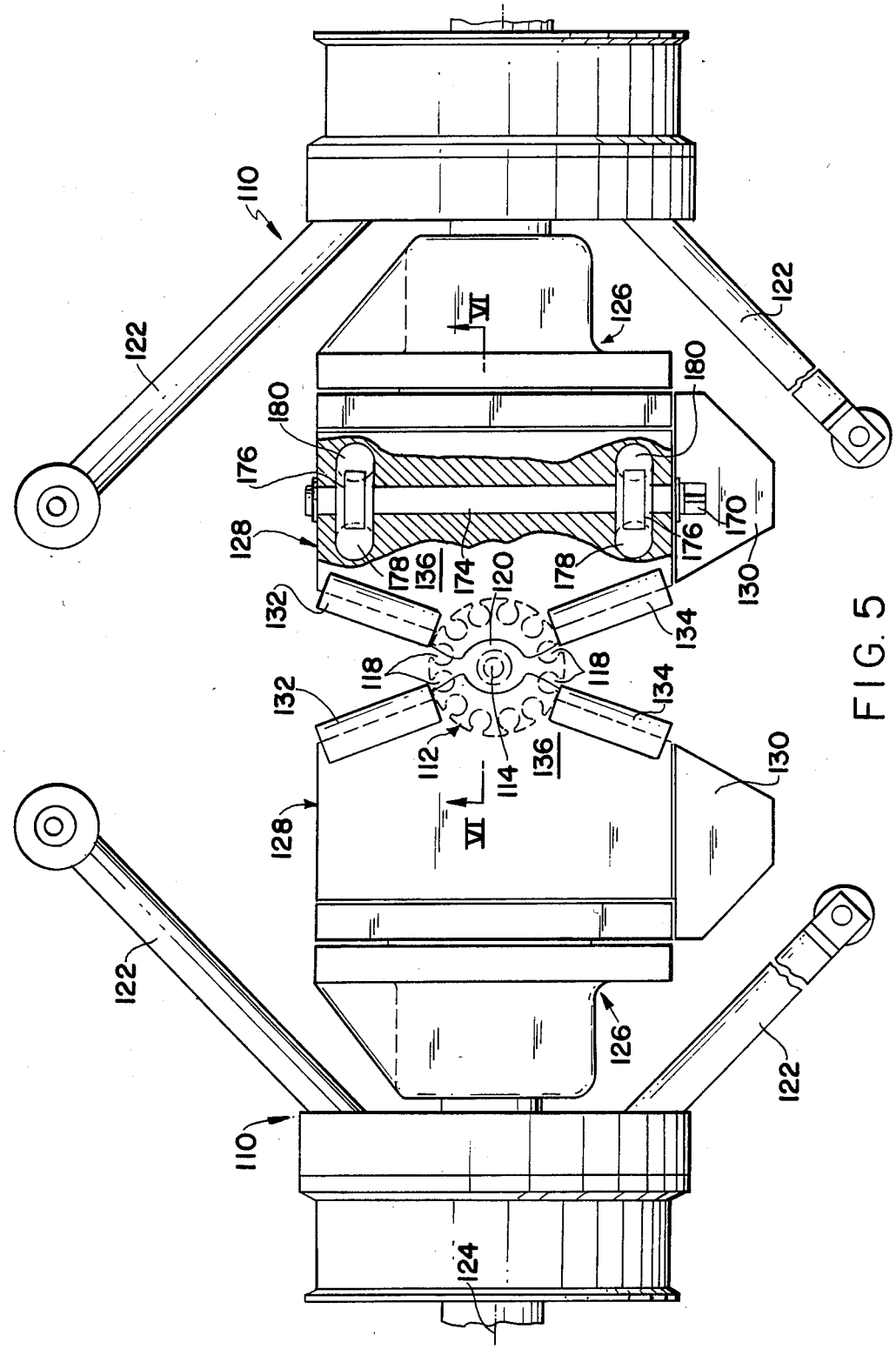
FIG. 5 is a front elevational view of a second exemplary embodiment of an adjustable chuck assembly constructed in accordance with the present invention, a portion of the chuck assembly being broken away to facilitate consideration and discussion.
Figure 6:
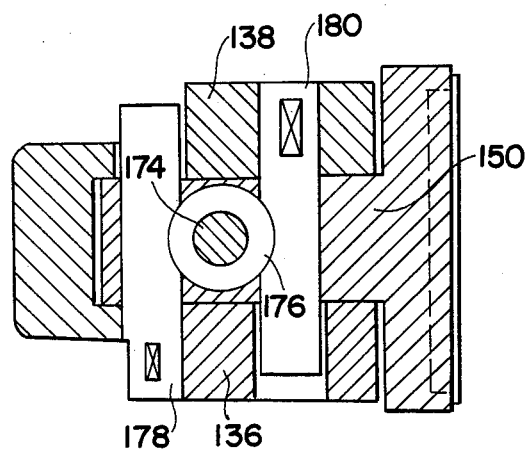
FIG. 6 is a cross-sectional view, taken along line VI—VI of FIG. 5 and looking in the direction of the arrows, of the adjustable chuck assembly shown in FIG. 5.
Figure 7:
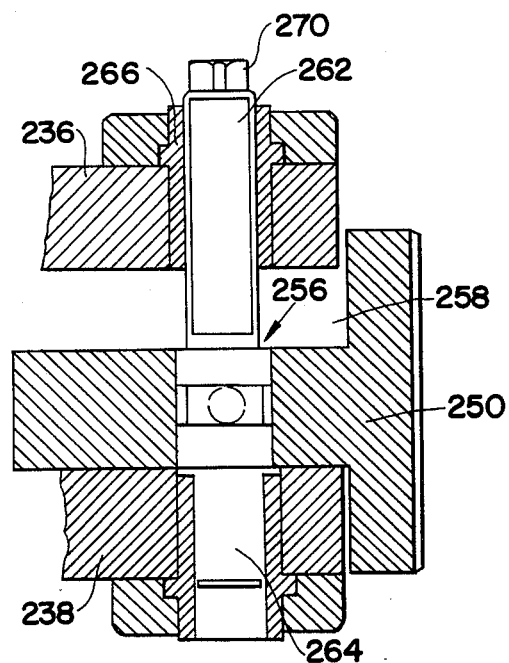
FIG. 7 is a cross-sectional view of a third exemplary embodiment of an adjustable chuck assembly constructed in accordance with the present invention, the cross-sectional view being similar to that of FIG. 2.

Two other exemplary embodiments of an adjustable chuck constructed in accordance with the present invention are illustrated in FIGS. 5 and 6 and in FIG. 7. Elements illustrated in FIGS. 5 and 6 and in FIG. 7 which correspond to the elements described above with respect to FIGS. 1–4 have been designated by corresponding reference numerals increased by 100 and 200, respectively. The embodiments of FIGS. 5 and 6 and of FIGS. 7 operate in the same manner as the embodiment of FIGS. 1–4 unless it is otherwise stated.

Referring now to FIGS. 5 and 6, there is shown a pair of armature winding machines 110, each of the armature winding machines 110 flanking an opposite side of a winding station for an armature 112 (shown in phantom) which is supported for incremental rotation about an axis 114. As the armature 112 is incrementally rotated (i.e., indexed), different pairs of slots 118 in a core 120 of the armature 112 are successively positioned so as to receive lead wires (not shown) which are wound into coils having a multiplicity of turns by flyers 122 which rotate about an axis 124 arranged perpendicular to the axis 114. In addition to the flyer 122, each of the armature winding machines 110 includes a stationary hub 126. Each of the hubs 126 is provided with a chuck 128, which is balanced by a counterweight 130.

Each of the chucks 128 includes a pair of stationary longitudinal deflectors or wings 132, 134 and a separate pair of movable frontal deflectors or wings 136, 138. Each of the chucks 128 also includes a mounting block 150 which fixedly supports the longitudinal deflectors 132, 134, while movably supporting the frontal deflectors in a manner to be described hereinafter.

A rotatable shaft 174 extends through the mounting block 150. Sprocket wheels 176, having sprockets (not shown), are mounted adjacent to opposite ends of the shaft 174 for rotation therewith. Each of the sprocket wheels 176 meshes with racks 178, 180. The racks 178 are fixedly attached to the frontal deflector 136 such that rotation of the shaft 174 will cause the automatic linear movement of the racks 178 and hence the frontal deflector 136. The racks 180 are fixedly attached to the frontal deflector 138 such that rotation of the shaft 174 will cause the automatic linear movement of the racks 180 and hence the frontal deflector 138. One end of the shaft 174 terminates in a head 170 designed to permit the manual or automatic rotation of the shaft 174. More particularly, when the shaft 174 is rotated in one angular direction, the frontal deflectors 136, 138 are simultaneously moved away from each other at the same rate to thereby accommodate armatures having cores which are longer than the core 120 of the armature 112. When, on the other hand, the shaft 174 is rotated in an opposite angular direction, the frontal deflectors 136, 138 are simultaneously moved toward each other at the same rate to thereby accommodate armatures having cores which are shorter than the core 120 of the armature 112.

With reference to FIG. 7, only one of two frontal deflectors or wings 236, 238 is movable relative to a mounting block 250 through which a rod 256 extends. The rod 256 has one end 262 which movably positions the frontal deflector 236 in a guide channel 258 formed in the mounting block 250, while the frontal deflector 238 is fixedly attached to the mounting block 250 by an opposite end 264 of the rod 256. The end 262 of the rod 256 is provided with external threads which threadedly engage internal threads provided in a sleeve 266 which is fixed to the frontal deflector 236 such that rotation of the rod 256 will cause the automatic linear movement of the sleeve 266 and hence the frontal deflector 236. The end 262 of the rod 256 terminates in a head 270 designed to permit the manual or automatic rotation of the rod 256. Thus, when the rod 256 is rotated in one angular direction, the frontal deflector 236 is moved away from the frontal deflector 238 to thereby accommodate armatures having longer cores. When, on the other hand, the rod 256 is rotated in an opposite angular direction, the frontal deflector 236 is moved toward the frontal deflector 238 to thereby accommodate armatures having shorter cores. In order to maintain proper balance, a counterweight (not shown) may be moved by, for instance, a suitable screw-type mechanism to compensate for the movement of the frontal deflector 236.

It will be understood that the embodiments described herein are merely exemplary and that a person skilled in the art may make many variations and modifications without departing from the spirit and scope of the invention. All such modifications and variations are intended to be included within the scope of the invention as defined in the appended claims.

We claim:

1. An adjustable chuck for an armature winding machine which employs a flyer, said chuck comprising guiding means for continuously guiding a wire as it is being wound into a pair of slots in a core of an armature by said flyer, said guiding means including a first guide member positioned adjacent to one of the slots and extending along at least the entire length of the core of the armature, a second guide member positioned adjacent to the other slot and extending along at least the entire length of the core of the armature, a third guide member positioned adjacent to one end of the core of the armature and extending between said first and second guide members, and a fourth guide member positioned adjacent to an opposite end of the core of the armature and extending between said first and second guide members, said first, second, third and fourth guide members cooperating with each other to form a continuous wire guide path thereby facilitating the performance of a high speed winding operation by said flyer, and adjusting means for adjusting the position of said third guide member relative to said fourth guide member without having to adjust said first and second guide members, whereby said chuck can be adjusted to accommodate armatures having cores of various different lengths, said adjusting means including a first internally threaded member fixedly attached to said third guide member, said first internally threaded member including a first set of internal threads, and a first externally threaded member, said first externally threaded member being rotatable and including a first set of external threads which threadedly engages said first set of internal threads such that rotation of said first externally threaded member causes the automatic linear movement of said first internally threaded member and hence said third guide member.

2. An adjustable chuck according to claim 1, wherein said adjusting means further includes rotating means for rotating said first externally threaded member.

3. An adjustable chuck according to claim 2, wherein said adjusting means further includes a second internally threaded member fixedly attached to said fourth guide member, said second internally threaded member including a second set of internal threads, and a second externally threaded member, said second externally threaded member being rotatable and including a second set of external threads which threadedly engages said second set of internal threads such that rotation of said second externally threaded member causes the automatic linear movement of said second internally threaded member and hence said fourth guide member, said second externally threaded member being connected to said first externally threaded member such that rotation of said first externally threaded member causes a corresponding rotation of said second externally threaded member.

4. An adjustable chuck according to claim 3, wherein said first and second sets of internal threads and said first and second sets of external threads are designed such that upon the rotation of said first and second externally threaded members said third and fourth guide members are moved away from each other at the same rate in order to accommodate armatures having longer cores and such that upon the reverse rotation of said first and second externally threaded members said third and fourth guide members are moved toward each other at the same rate in order to accommodate armatures having shorter cores.

5. An adjustable chuck for an armature winding machine, said chuck comprising guiding means for continuously guiding a wire as it is being wound into a pair of slots in a core of an armature, said guiding means including a first guide member positioned adjacent to one of the slots and extending along at least the entire length of the core of the armature, a second guide member positioned adjacent to the other slot and extending along at least the entire length of the core of the armature, a third guide member positioned adjacent to one end of the core of the armature and extending between said first and second guide members, and a fourth guide member positioned adjacent to an opposite end of the core of the armature and extending between said first and second guide members, and adjusting means for adjusting the position of said third guide member relative to said fourth guide member without having to adjust said first and second guide members, whereby said chuck can be adjusted to accommodate armatures having cores of various different lengths, said adjusting means including a first internally threaded member fixedly attached to said third guide member, said first internally threaded member including a first set of internal threads, and a first externally threaded member, said first externally threaded member being rotatable and including a first set of external threads which threadedly engages said first set of internal threads such that rotation of said first externally threaded member causes the automatic linear movement of said first internally threaded member and hence said third guide member.

6. An adjustable chuck according to claim 5, wherein said adjusting means further includes rotating means for rotating said first externally threaded member.

7. An adjustable chuck according to claim 6, wherein said adjusting means further includes a second internally threaded member fixedly attached to said fourth guide member, said second internally threaded member including a second set of internal threads, and a second externally threaded member, said second externally threaded member being rotatable and including a second set of external threads which threadedly engages said second set of internal threads such that rotation of said second externally threaded member causes the automatic linear movement of said second internally threaded member and hence said fourth guide member, said second externally threaded member being connected to said first externally threaded member such that rotation of said first externally threaded member causes a corresponding rotation of said second externally threaded member.

8. An adjustable chuck according to claim 7, wherein said first and second sets of internal threads and said first and second sets of external threads are designed such that upon the rotation of said first and second externally threaded members said third and fourth guide members are moved away from each other at the same rate in order to accommodate armatures having longer cores and such that upon the reverse rotation of said first and second externally threaded members said third and fourth guide members are moved toward each other at the same rate in order to accommodate armatures having shorter cores.

* * * * *